(12) United States Patent
Koo

(10) Patent No.: US 6,938,885 B2
(45) Date of Patent: Sep. 6, 2005

(54) HYBRID TYPE COOLING TOWER

(75) Inventor: Jae-Byeong Koo, Incheon (KR)

(73) Assignee: Kyung In Machinery Co., Ltd. (KR)

( * ) Notice: Subject to any disclaimer, the term of this patent is extended or adjusted under 35 U.S.C. 154(b) by 63 days.

(21) Appl. No.: 10/344,485

(22) PCT Filed: Jul. 18, 2001

(86) PCT No.: PCT/KR01/01228

§ 371 (c)(1), (2), (4) Date: Feb. 11, 2003

(87) PCT Pub. No.: WO02/14768

PCT Pub. Date: Feb. 21, 2002

(65) Prior Publication Data

US 2003/0173688 A1 Sep. 18, 2003

(30) Foreign Application Priority Data

Aug. 11, 2000 (KR) ........................................ 2000-22896
Apr. 10, 2001 (KR) ........................................ 2001-18895

(51) Int. Cl.⁷ ................................................. B01F 3/04
(52) U.S. Cl. ............................ 261/112.2; 261/DIG. 11; 261/DIG. 72
(58) Field of Search ................................ 261/108, 109, 261/111, 112.1, 112.2, DIG. 11, DIG. 72

(56) References Cited

U.S. PATENT DOCUMENTS 4,320,073 A * 3/1982 Bugler et al. ............ 261/112.2
4,548,766 A * 10/1985 Kinney et al. ............ 261/112.2
4,801,410 A * 1/1989 Kinney et al. ............ 261/112.2
5,585,047 A * 12/1996 Mortensen et al. .......... 261/109
5,944,094 A * 8/1999 Kinney et al. .............. 165/166
6,260,830 B1 * 7/2001 Harrison et al. .......... 261/112.2

FOREIGN PATENT DOCUMENTS

| JP | 52-136261 | 10/1977 |
|----|-----------|---------|
| JP | 55-162772 | 11/1980 |
| JP | 59-186669 | 12/1984 |

* cited by examiner

Primary Examiner—Scott Bushey
(74) Attorney, Agent, or Firm—Reising, Ethington, Barnes, Kisselle, P.C.

(57) ABSTRACT

Disclosed is a hybrid type cooling tower. The cooling tower includes a water distributing device for distributing cooling water of a high temperature, a counterflow type filler through which the cooling water distributed from the water distributing device flows downward, an eliminator for preventing drift of the cooling air, louvers which serve as passages for allowing inflow of outside air, a fan for forcibly circulating the outside air through the cooling tower and discharging air to the outside, which air undergone heat exchange with the cooling water, and a water tank for collecting the cooling water which is chilled while flowing downward through the counterflow type filler. In the present invention, a crossflow type filler is disposed inside the louvers and under the counterflow type filler.

19 Claims, 7 Drawing Sheets

HYBRID TYPE COOLING TOWER

TECHNICAL FIELD

The present invention relates to a cooling tower which is used for cooling water in a refrigerator, a heat exchanger, an air conditioning system, etc., and more particularly, the present invention relates to a hybrid type cooling tower which takes advantages of a counterflow type cooling tower and a crossflow type cooling tower.

BACKGROUND ART

A cooling tower functions to cool water from a high temperature to a low temperature in such a way as to allow recycling thereof, so that water of high quality can be continuously supplied in a refrigerator, a heat exchanger, an air conditioning system, etc.

Cooling towers are generally divided into a counterflow type cooling tower and a crossflow type cooling tower depending upon a heat exchanging method.

In a counterflow type cooling tower, as water of a high temperature which flows downward through fillers is brought into contact with air which is sucked from the outside and flows upward, the hot water is cooled. In a crossflow type cooling tower, as water of a high temperature which flows downward through fillers is crossed with air which is sucked from the outside and flows substantially in a horizontal direction, the hot water is cooled.

When comparing the counterflow type cooling tower and crossflow type cooling tower from the standpoint of efficiency, assuming that an amount of water and a heat exchange coefficient are the same, the former is superior to the latter in that the former occupies a reduced volume and it is easy to analyze design, capacity and heat exchange capability of the former. However, when comparing the former and the latter from the standpoint of power consumption, the latter is superior to the former in that air flow resistance is diminished while ventilation is implemented by a fan, and, thereby, static pressure loss and power loss are decreased.

Further, when comparing the counterflow type cooling tower and crossflow type cooling tower from the standpoint of external size, the latter is advantageous in terms of height in that various arrangements are horizontally positioned, and the former is advantageous in terms of cross-sectional area in that various arrangements are vertically positioned. In the case of the counterflow type cooling tower, difficulties are caused upon inspecting and repairing a diversity of devices which are located inside the cooling tower, specifically adjacent to a lower water tank, including a pipeline, a filtering device, etc.

In addition, the counterflow type cooling tower and crossflow type cooling tower have their respective advantages and disadvantages with respect to air dispersion, water distribution structure and noise generation.

DISCLOSURE OF THE INVENTION

Accordingly, the present invention has been made in an effort to solve the problems occurring in the related art, and an object of the present invention is to provide a hybrid type cooling tower which takes advantages of and overcomes disadvantages of a counterflow type cooling tower and a crossflow type cooling tower, thereby significantly improving cooling capability and reducing power loss.

Another object of the present invention is to provide a hybrid type cooling tower which allows a diversity of devices located therein to be conveniently inspected and repaired.

Still another object of the present invention is to provide a hybrid type cooling tower which can be easily installed with a reduced cost.

In order to achieve the first object, according to one aspect of the present invention, there is provided a hybrid type cooling tower including a water distributing device for distributing water of a high temperature, counterflow type fillers through which the water distributed from the water distributing device flows downward, a first eliminator for preventing drift of the water, louvers serving as passages for allowing inflow of outside air, a fan for forcibly circulating the outside air through the cooling tower and discharging air having undergone heat exchange with the water, to the outside, and a lower water tank for collecting the water which is cooled while flowing downward through the counterflow type fillers, characterized in that the hybrid type cooling tower further includes crossflow type fillers disposed inward of the louvers and below the counterflow type fillers.

Here, the crossflow type filler has a plurality of mountain-shaped contours each of which comprises rightward inclined parts and leftward inclined parts which are alternately and integrally connected with each other in such a way as to define a zigzag pattern, with each leftward inclined part having a length no less than each rightward inclined part, at least one of the rightward inclined parts of each mountain-shaped contour being formed with pyramid-shaped portions.

Specifically, a space part through which the outside air can flow into the cooling tower is defined below lower ends of the crossflow type fillers.

Also, the space part has a height which is no greater than 30% of a height of the crossflow type filler.

Further, a first water dripping noise attenuation plate is arranged at an upper end of the space part.

Moreover, supporting pipes are installed through the crossflow type fillers, spacer projections are formed on the crossflow type fillers, and strength reinforcing parts are provided to upper and lower ends of the crossflow type fillers.

Furthermore, the crossflow type filler is made of a single sheet material which does not have any joint portion.

In order to achieve the second object, according to another aspect of the present invention, a wedge-shaped partition wall is disposed at a center portion of the crossflow type fillers. Venting holes through which the outside air can flow into the cooling tower are defined in the wedge-shaped partition wall. Also, a second eliminator for preventing drift of the water may be interposed between the crossflow type fillers and the wedge-shaped partition wall.

Further, a second water dripping noise attenuation plate may be placed on the wedge-shaped partition wall.

In order to achieve the third object, according to still another aspect of the present invention, the cooling tower is supported by the wedge-shaped partition wall disposed at the center portion of the crossflow type fillers and an X-shaped turnbuckle installed adjacent to air inlet holes through which air is sucked toward the crossflow type fillers.

Here, the cooling tower may include the wedge-shaped partition wall, the X-shaped turnbuckle, a two-piece upper casing, a four-piece lower casing, the one-piece lower water tank, and a base platform.

Also, reinforcing prominences and depressions are formed on the lower casing and door members which respectively close both ends of the wedge-shaped partition wall.

BRIEF DESCRIPTION OF THE DRAWINGS

The above objects, and other features and advantages of the present invention will become more apparent after a reading of the following detailed description when taken in conjunction with the drawings, in which.

BEST MODE FOR CARRYING OUT THE INVENTION

Figure 1:
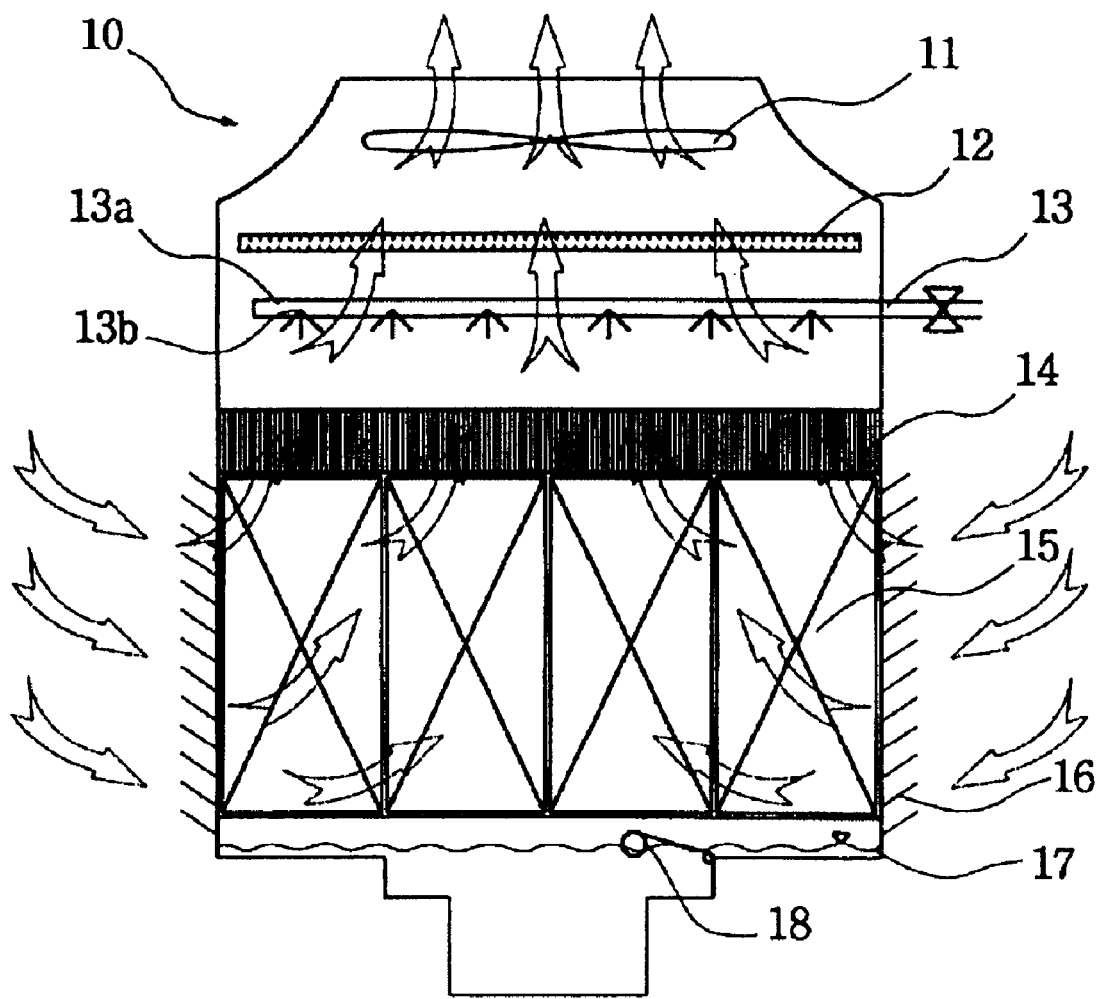
FIG. 1 is a cross-sectional view schematically illustrating a hybrid type cooling tower in accordance with a first embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a cross-sectional view schematically illustrating a hybrid type cooling tower in accordance with a first embodiment of the present invention. The cooling tower 10 is divided into an upper section in which counterflow type fillers are located and a lower section in which crossflow type fillers are located.

As shown in FIG. 1, at a top of the cooling tower 10, there is arranged a fan 11.

After air flows from the outside into the cooling tower and undergoes heat exchange with water which flows in the cooling tower, the air is forcibly discharged to the outside through a fan stack. An eliminator 12 is positioned below the fan 11 so that water droplets or water vapor contained in the air which is forcibly discharged out of the cooling tower is prevented from drifting.

A water distribution device 13 for distributing water of a high temperature is positioned below the eliminator 12. The water distribution device 13 comprises a pipe 13a through which water of a high temperature is fed, and a nozzle 13b or a sprinkler which is installed on the pipe 13a.

The counterflow type fillers 14 are disposed below the water distribution device 13. The crossflow type fillers 15 are disposed below the counterflow type fillers 14 in a manner such that they are brought into close contact with the counterflow type fillers 14. A lower water tank 17 is formed below the crossflow type fillers 15, so that water, which is cooled while flowing downward through the counterflow type fillers 14 and the crossflow type fillers 15 and has a low temperature, is collected in the lower water tank 17.

As water of a high temperature, which is distributed from the water distribution device 13 and flows downward through the counterflow type fillers 14, is brought into contact with air which is sucked from the outside into the cooling tower 10 and flows upward after passing through the crossflow type fillers 15, the hot water is primarily cooled. Then, as the primarily cooled water which flows downward through the crossflow type fillers 15 is crossed with air which is freshly sucked from the outside into the cooling tower 10 and flows substantially in a horizontal direction, the hot water is secondarily cooled. Thereupon, the cooled water is collected in the lower water tank 17.

Outward of the crossflow type fillers 15, louvers 16 are installed on the cooling tower 10 over a length which extends from approximately a middle portion of the cooling tower 10 to an upper end of the lower water tank 17. The louvers 16 guide inflow of air into the cooling tower 10 and prevent water droplets which flow downward through the crossflow type fillers 15, from drifting out of the cooling tower 10.

A float valve 18 is installed on the lower water tank 17 so that water can be replenished into the lower water tank 17. A circulation pipeline for circulating water collected in the lower water tank 17 is connected to a lower end of the lower water tank 17. A filtering device for filtering impurities, such as dust, pollutants, etc., contained in the water, is intervened between the circulation pipeline and the lower water tank 17.

Hereafter, a heat exchanging operation between water and air, which occurs in the cooling tower constructed as mentioned above, will be described in detail from the standpoint of water.

Water, which is increased in its temperature during passage through a refrigerator, an air conditioning system or an industrial heat exchanging device, is distributed through the water distribution device 13 over entire upper surfaces of the counterflow type fillers 14. The water having a high temperature flows downward while forming a thin water film on surfaces of the counterflow type fillers 14, and at the same time, primarily exchanges heat with air which is sucked from the outside through the louvers 16 into the cooling tower 10 and flows upward after passing through the crossflow type fillers 15, whereby the water is primarily cooled. The primarily cooled water flows downward while forming also a thin water film on surfaces of the crossflow type fillers 15 disposed under the counterflow type fillers 14, and at the same time, secondarily exchanges heat with air which is freshly sucked from the outside through the louvers 16 into the cooling tower 10 and flows substantially in a horizontal direction, whereby the water is secondarily cooled. Thereupon, the cooled water is collected in the lower water tank 17.

The water which is collected in the lower water tank 17 is fed again through the filtering device and the circulation pipeline into the refrigerator, the air conditioning system or the industrial heat exchanging device.

Hereinbelow, the heat exchanging operation between water and air, which occurs in the cooling tower constructed as mentioned above, will be described in detail from the standpoint of the air.

Fresh ambient air, which is forcibly sucked from the outside through the louvers 16 into the cooling tower 10 by the fan 11 arranged at the top of the cooling tower 10, primarily exchanges heat with the water of a reduced temperature, which flows downward through the crossflow type fillers 15 disposed under the counterflow type fillers 14 after being cooled to a greater or lesser extent during passage through the counterflow type fillers 14, whereby the air is primarily warmed up. The primarily warmed air secondarily exchanges heat with the water of a high temperature which flows downward through the counterflow type fillers 14 disposed over the crossflow type fillers 15, whereby the air is secondarily warmed up. Thereupon, the warmed air is forcibly discharged out of the cooling tower 10 through the fan stack arranged at the top of the cooling tower 10.

Consequently, it is to be readily understood that, since, as described above, the heat exchanging operation occurs through two steps by the upwardly positioned counterflow type fillers 14 and the downwardly positioned crossflow type fillers 15, cooling performance of the cooling tower 10 is improved when compared to the conventional art.

On the other hand, by experiments which were conducted while changing heights and separations of respective fillers, so as to obtain an economical combination ratio between the counterflow type fillers 14 and the crossflow type fillers 15, results as given in TABLE 1 were obtained.

Cooling towers used in the experiments have a cross-sectional area of 3.2 m×2.2 m. Counterflow type fillers have a reference height of 0.6 m, and crossflow type fillers have a reference height of 1.5 m. The experiments were conducted while changing a separation between two fillers from 12 mm to 19 mm depending upon a height of the fillers.

TABLE 1

| | Present Fillers A | Present Fillers B | Comparative Fillers A | Comparative Fillers B |
|---|---|---|---|---|
| Circulation Water (m$^3$/h) | 238.4 | 240.9 | 248 | 234 |
| Entrance Water Temperature (° C.) | 30.6 | 30.2 | 37 | 37 |
| Exit Water Temperature (° C.) | 25.4 | 25.1 | 32 | 32 |
| Wet-bulb Temperature of Inlet Air (° C.) | 17.4 | 16.8 | 27 | 27 |
| Power(kW) | 10.2 | 10.4 | 11 | 11 |
| Cooling Capacity (CRT) | 330.7 | 324.0 | 318 | 300 |
| Noise at 2m (dBA) | 71 | 74 | 76 | 70 |
| Area(m$^2$) | 7.04 | 7.04 | 7.02 | 10.96 |
| Capacity Ratio (CRT/m$^2$) | 46.97 | 46.02 | 45.3 | 27.37 |

Performance tests for the cooling towers were implemented using a CTI (Cooling Tower Institute) test code ATC-105, and concrete performance determination was made with reference to a characteristic curve rendered by the same test code.

Experiments were not actually conducted for the comparative fillers, and, instead, performance which is certified for commercially available products by a CTI standard STD-201 was employed.

In the case of the present fillers A, counterflow type and crossflow type fillers have respective heights of 0.4 m and 1.5 m, and respective filler separations of 12 mm and 17 mm.

In the case of the present fillers B, counterflow type and crossflow type fillers have respective heights of 0.6 m and 1.1 m, and respective filler separations of 12 mm and 15 mm. Also, in order to check variations in air inflow rate and water dripping noise, the crossflow type fillers were cut adjacent to lower ends thereof.

Counterflow type fillers, which are used in a counterflow type cooling tower manufactured in U.S.A., were adopted as the comparative fillers A. In this case, the cooling tower had a cross-sectional area of 2.34 m×3.0 m and a height of 1.07 m, and a filler separation was 12 mm.

Crossflow type fillers, which are used in a crossflow type cooling tower manufactured in Korea, were adopted as the comparative fillers B. In this case, the cooling tower had a cross-sectional area of 2.25 m×4.87 m.

Cooling capacities were calculated in comparison with a reference capacity of a reference cooling tower using power of 11 kW. 1 CRT is defined as a cooling capacity able to cool water from an entrance temperature of 37° C. to an exit temperature of 32° C. under a condition where a wet-bulb temperature of air at an entrance is 27° C. and an air flow rate is 0.78 m$^3$/h.

While it is difficult to induce optimal efficiency by adjusting a height of fillers and a filler separation, it was found by the experiments that the more a height is decreased in the case of the counterflow type fillers and a filler separation is increased in the case of the crossflow type fillers, the more efficient is the cooling capacity which can be obtained.

It is to be readily understood from TABLE 1 that the present fillers reveal excellent capacity ratios when compared to the comparative fillers, and noise generation is increased in the order of the present fillers A, the present fillers B and the comparative fillers A.

Figure 2:
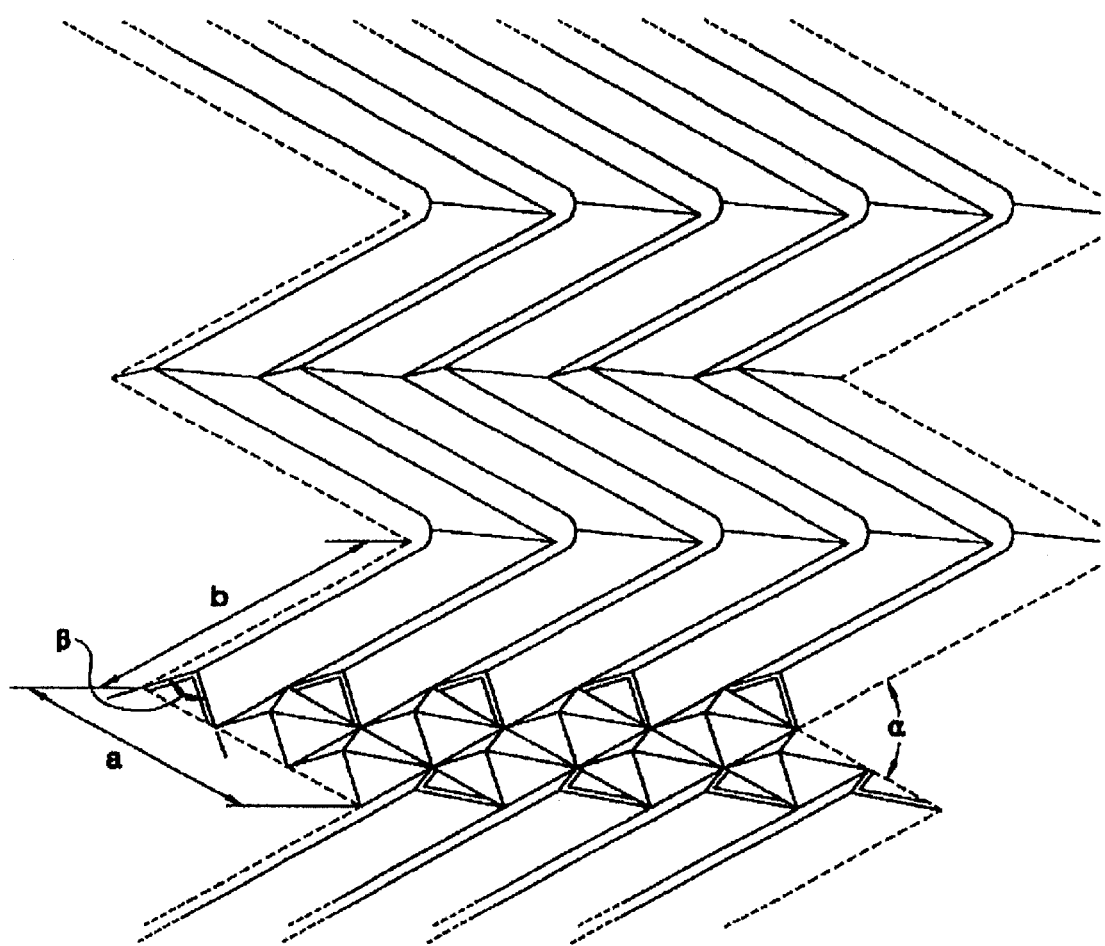
FIG. 2 is a view illustrating a structure of a counterflow type filler which is disposed in the hybrid type cooling tower according to the present invention.

Next, in order to further improve the cooling capacity, the crossflow type fillers can have a structure as shown in FIG. 2.

That is to say, the crossflow type filler has a plurality of mountain-shaped contours each of which comprises rightward inclined parts a and leftward inclined parts b which are alternately and integrally connected with each other in such a way as to define a zigzag pattern. Each leftward inclined part b has a length which is no less than that of each rightward inclined part a. At least one of the rightward inclined parts a of each mountain-shaped contour is formed with pyramid-shaped portions by being partially cut off.

Figure 3:
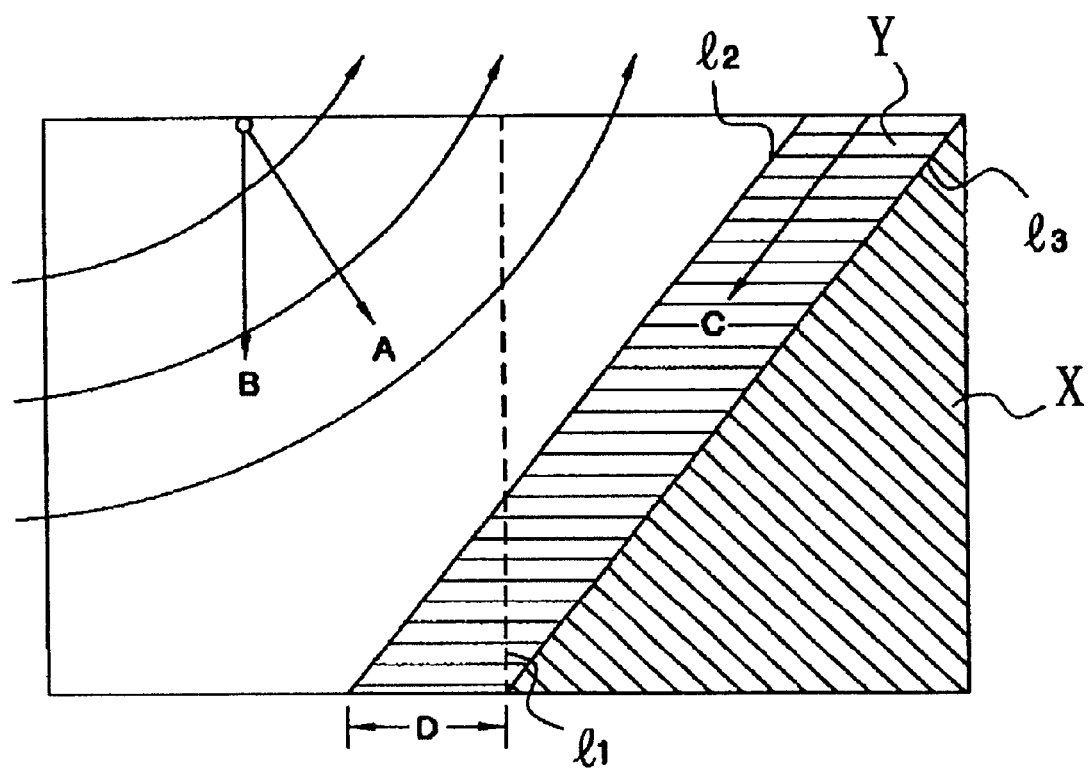
FIG. 3 is an enlarged view of a left portion of the counterflow type filler of the present invention, for explaining water flow.

By varying a length ratio between the parts a and b of the mountain-shaped contour of the crossflow type filler (for example, within the range of 1:1.3~1.6), water which flows downward along the surfaces of the crossflow type filler and is forced toward a direction A in FIG. 3 by flow of sucked air, is moved in a vertical direction B, whereby the cooling capacity is improved.

However, a suction air flow rate is decreased in a center portion, that is, a region X, of the crossflow type fillers. In particular, in the case that a wedge-shaped partition wall is disposed at the center portion of the crossflow type fillers as will be described later in detail, water flows downward while not being brought into contact with the air at all.

To cope with this phenomenon, by partially cutting off at least one rightward inclined part a in each mountain-shaped contour of the crossflow type filler so that the pyramid-shaped portions are formed to each have the same width and extend in the same direction as the leftward inclined part b, as the water flowing downward has a greater vector, it is possible to redirect the water flow to a great extent, toward the vertical direction, against the suction air flow.

In other words, in FIG. 3, the water flow is redirected toward a direction C in a region Y which is occupied by the pyramid-shaped portions so that an increased amount of air is brought into contact with the suction air, whereby the cooling capacity is improved.

By tests conducted by the present applicant, it was found to be preferable that an air velocity across the cross-sectional area of the cooling tower is 2.2~3.4 m/sec, the length ratio b/a between the leftward inclined part b and the rightward inclined part a in the mountain-shaped contour is 1.333 (which is within the range of 1.3~1.6), and an inclination angle $\alpha$ is 33.3° (which is within the range of 25~35°). Also, while a vertical angle $\beta$ of the inclined part does not significantly influence a reliable operation of the cooling tower, it is preferable that the vertical angle $\beta$ is approximately 60~90°.

A person skilled in the art will readily recognize that an area (represented by a character D in FIG. 3), which is occupied by the pyramid-shaped portions formed by partially cutting off the rightward inclined part, can be properly adjusted to accomplish an optimal cooling effect. Although the area is related with dimensions of the fillers, it is appropriate that a vertical line 11, which extends upward from a lower end of the region X, that is, the center portion of the crossflow type fillers (in particular, where the wedge-shaped partition wall is positioned), intersects with a left boundary line 12 of the region Y occupied by the pyramid-shaped portions, and the left boundary line 12 is inclined by ±15° with respect to a boundary line 13 of the X region.

Figure 4:
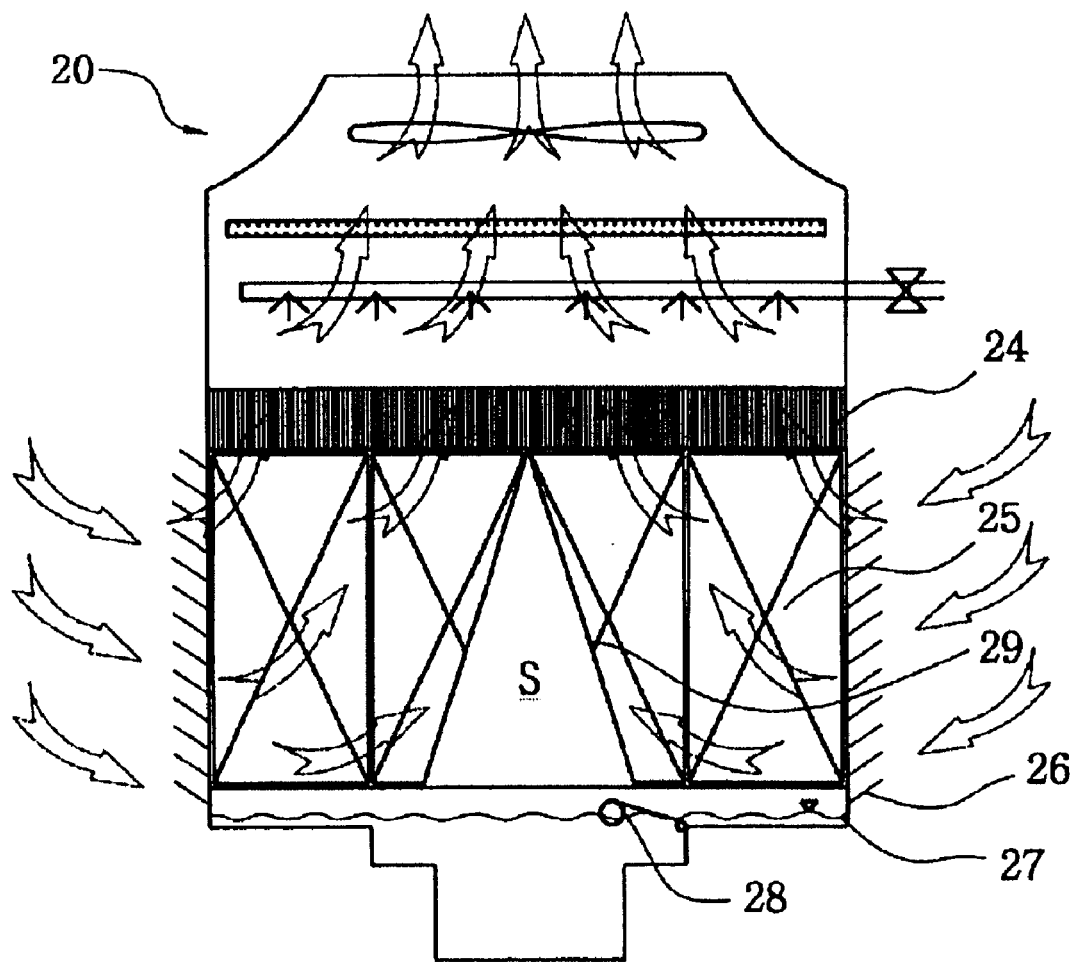
FIG. 4 is a cross-sectional view schematically illustrating a hybrid type cooling tower in accordance with a second embodiment of the present invention.

FIG. 4 is a cross-sectional view schematically illustrating a hybrid type cooling tower in accordance with a second embodiment of the present invention. In the hybrid type cooling tower 20 according to this second embodiment of the present invention, a wedge-shaped partition wall 29 is disposed at a center portion of crossflow type fillers 25 which are positioned under counterflow type fillers 24.

As can be readily seen from FIG. 4, an upper end, that is, a vertex of the wedge-shaped partition wall 29, is placed on a center of a lower surface of the counterflow type fillers 24. The wedge-shaped partition wall 29 extends downward through the center portion of the crossflow type fillers 25 in a manner such that a lower end thereof is positioned adjacent to a lower water tank 27. Due to its geometry, in the wedge-shaped partition wall 29, there is defined a working space S of a predetermined size.

Namely, the wedge-shaped partition wall 29 defines the working space S which has a size allowing a worker to execute operations therein. Owing to the presence of the working space S, inspection and maintenance can be easily implemented for a float valve 28 installed on the lower water tank 27 inside the cooling tower 20, and for a variety of devices arranged to a lower end of the lower water tank 27, such as a water filtering device, a circulation pipeline, etc.

By the fact that the partition wall 29 has the wedge-shaped configuration, when ambient air is sucked from both sides through the louvers 26 into the cooling tower 20 and flows upward while exchanging heat with water flowing downward through the crossflow type fillers 25, it is possible to prevent turbulent flow from being created as suction air from both sides meets at the center portion of the crossflow type fillers 25. Also, because the ambient air which is sucked into the cooling tower 20 in a horizontal direction does not abruptly change its direction to flow vertically upward toward the counterflow type fillers 24, unstable air flow is not caused. That is to say, as the ambient air gradually changes a direction along inclined surfaces of the wedge-shaped partition wall 29, upward air flow is stabilized.

Also, since static pressure loss of airflow can be decreased by the presence of the wedge-shaped partition wall 29, power can be saved, and it is possible to prevent overload of devices such as a fan, etc.

Figure 5:
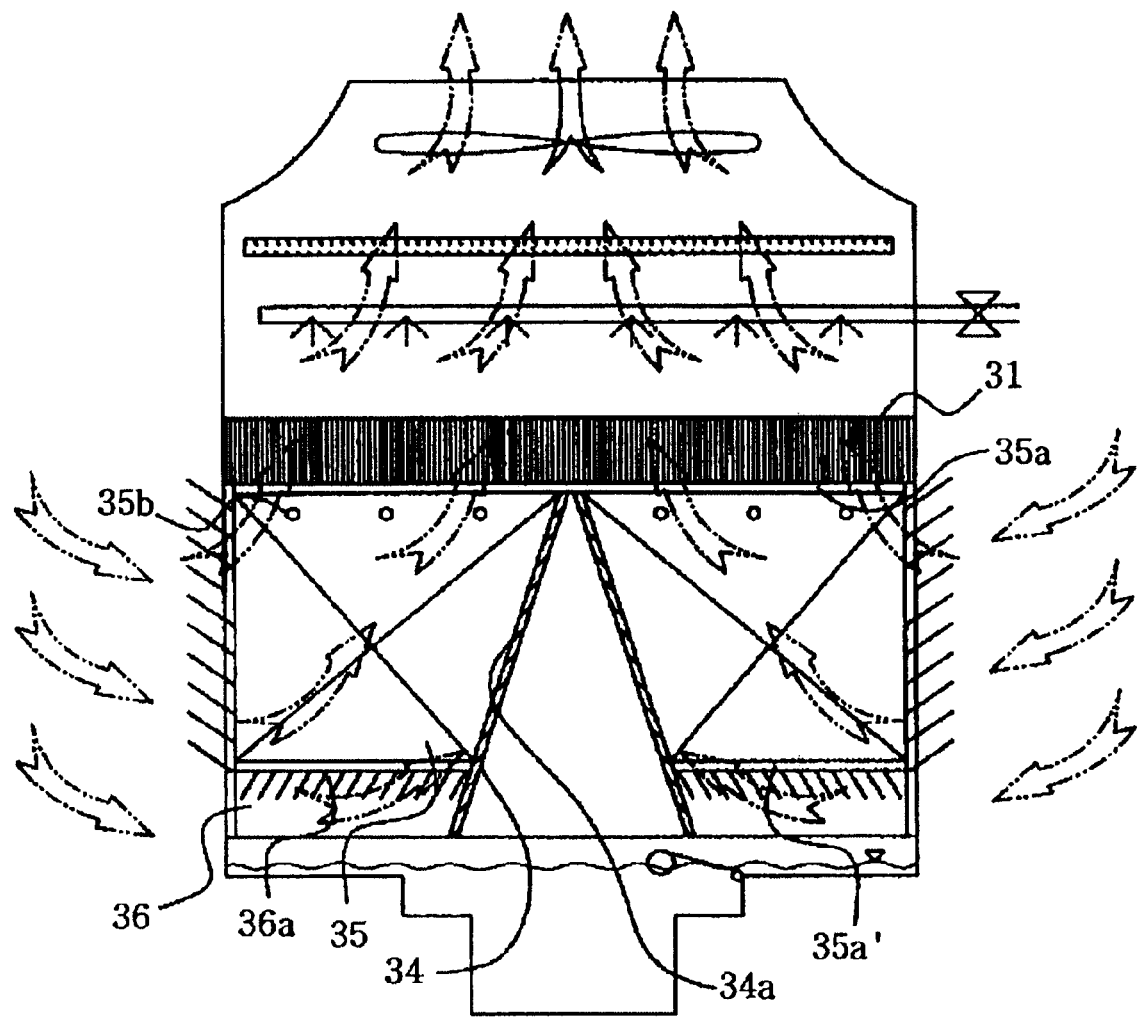
FIG. 5 is a cross-sectional view schematically illustrating a hybrid type cooling tower in accordance with a third embodiment of the present invention.

FIG. 5 is a cross-sectional view schematically illustrating a hybrid type cooling tower in accordance with a third embodiment of the present invention. The hybrid type cooling tower according to this third embodiment of the present invention is provided with means for smoothing suction of ambient air into the cooling tower and improving the cooling capacity of the cooling tower.

First, a wedge-shaped partition wall 34 is disposed at a center portion of crossflow type fillers 35. Venting members (not shown) such as a punched plate, a mesh, and the like, through which the outside air can flow into the cooling tower, are arranged on surfaces of the wedge-shaped partition wall 34. Also, venting members may be arranged on inspection doors 44 (see FIG. 6), which are provided to a casing of the cooling tower so that both front and rear ends of a working space defined in the wedge-shaped partition wall 34 can be opened and closed by the inspection doors 44. Thus, as the outside air is smoothly sucked into the cooling tower through the inspection doors 44 and the venting members, the cooling capacity of the cooling tower is remarkably improved.

An eliminator for preventing drift of the water is integrally attached to an inclined surface of the crossflow type fillers 35 which faces the wedge-shaped partition wall 34. By this fact, as water flows downward while not passing through the wedge-shaped partition wall 34, when a worker enters into the working space through the inspection door 44, the worker is protected from getting wet.

In the meanwhile, in order to further improve the cooling capacity of the cooling tower, a space part 36 can be defined below lower ends of the crossflow type fillers 35.

In other words, since air flow resistance is decreased in the space part 36 which is defined by cutting the crossflow type fillers 35 adjacent to lower ends thereof, an increased amount of air can be guided to flow toward a center of the cooling tower, whereby the cooling capacity of the cooling tower is further improved.

However, in the case that a height of the space part 36 is overly elevated, water dripping noise which is caused when water drips into a lower water tank is increased in proportion to the height of the space part 36. Also, an entire height of the cooling tower is increased and a space efficiency is decreased as in the conventional counterflow type fillers. Hence, it is preferred that the space part 36 has a height which is no greater than 30% of a height of the crossflow type fillers 35.

When the crossflow type filler 35 is made of a single sheet material which does not have any joint portion, air flow resistance is minimized and the cooling capacity is still further improved.

Due to the fact that a first water dripping noise attenuation plate 36a is arranged at an upper end of the space part 36, water dripping noise can be attenuated when the water flows downward through the crossflow type fillers 35. At the same time, it is preferred that a second water dripping noise attenuation plate 34a having a honeycomb-shaped configuration is placed on the surface of the wedge-shaped partition wall 34 so as to attenuate water dripping noise.

On the other hand, strength reinforcing parts 35a and 35a' may be provided to upper and lower ends of the crossflow type fillers 35 in a manner such that a strength of the crossflow type fillers 35 is maintained, the counterflow type fillers 31 positioned over the crossflow type fillers 35 are reliably supported, and water distribution is improved. Supporting pipes 35b for preventing the crossflow type fillers 35 from being bent and deformed are installed through the crossflow type fillers 35, and spacer projections (not shown) for spacing the crossflow type filers 35 one from another are formed on the crossflow type fillers 35.

Next, an architecture scheme of the hybrid type cooling tower according to the present invention will be described with reference to FIGS. 6 and 7.

Figure 6:
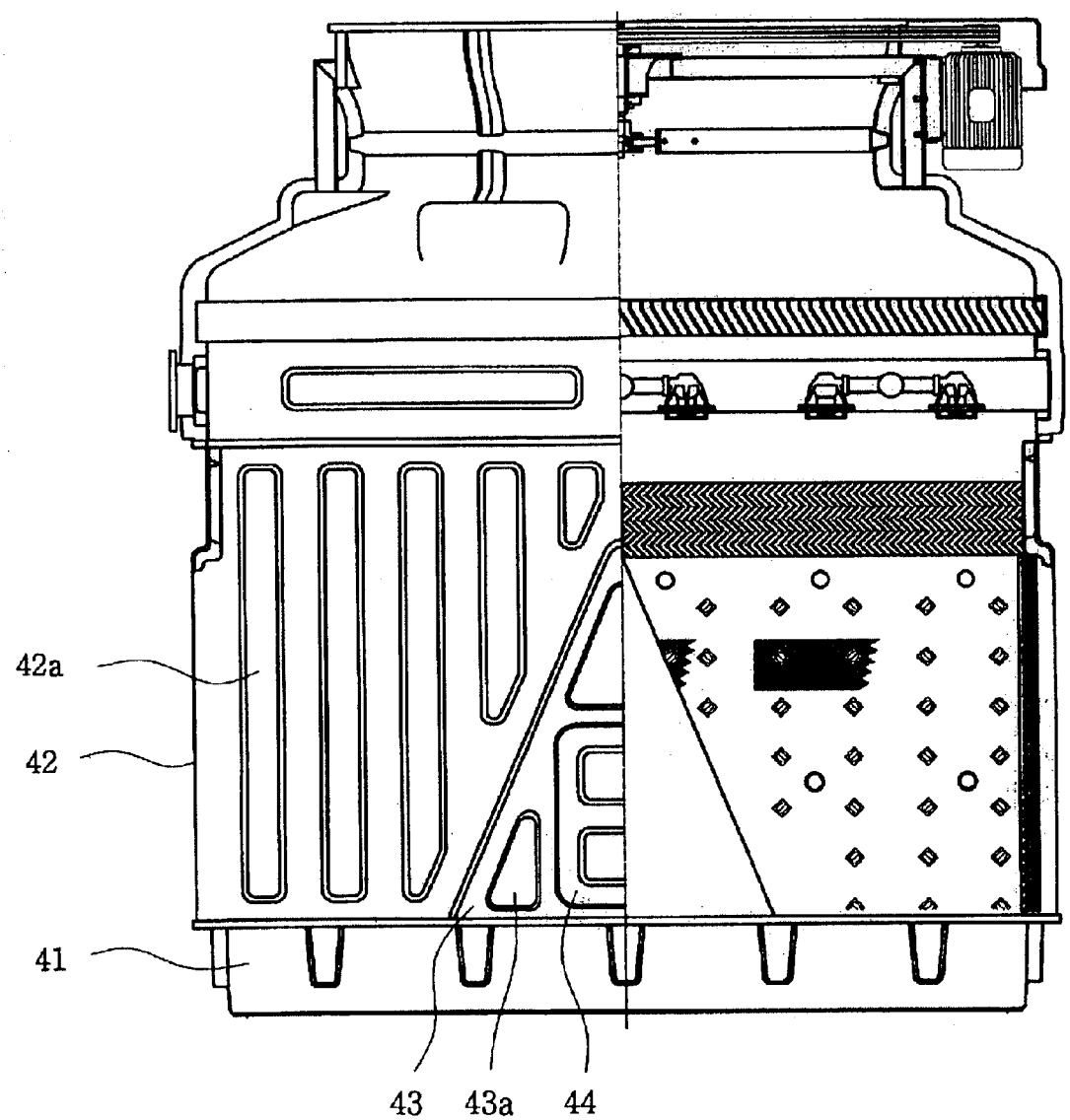
FIG. 6 is a front view illustrating an outer appearance of the hybrid type cooling tower according to the present invention.

First, as best shown in the front view of FIG. 6, a wedge-shaped partition wall 43 made of a suitable material such as glass fiber reinforced plastic is disposed at a center portion of a lower casing 42 which is positioned above a lower water tank 41.

The wedge-shaped partition wall 43 may be separately disposed at a rear section of the cooling tower which is symmetrical with a front section of the cooling tower. The wedge-shaped partition wall 43 which has a 180° rotated V-shaped outline is fastened to the lower casing 42 by means of bolts, or the like to form the casing as a rigid structural body. While it is advantageous that the wedge-shaped partition wall 43 has the 180° rotated V-shaped outline, it can be also envisaged that the wedge-shaped partition wall 43 has a 180° rotated U-shaped outline in consideration of aerodynamics and easiness upon access and inspection.

Reinforcing prominences and depressions 42a and 43a may be formed, by an embossing process or the like, on the lower casing 42 and door members which respectively close both ends of the wedge-shaped partition wall 43, whereby strength can be further increased.

Figure 7:
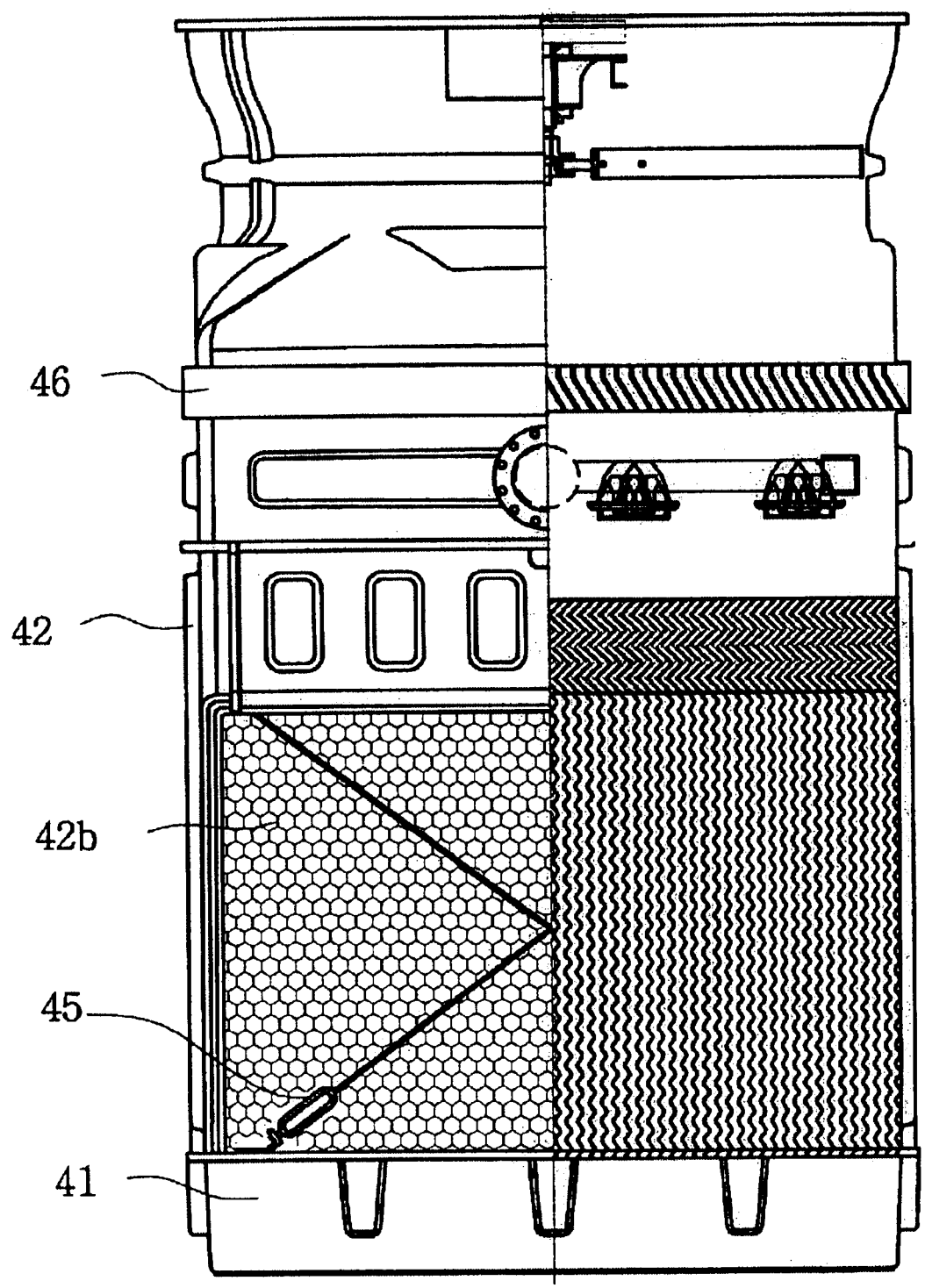
FIG. 7 is a side view of the hybrid type cooling tower of FIG. 6.

In the meanwhile, as shown in FIG. 7, at both sides of the cooling tower and above the lower water tank 41, the lower casing 42 is defined with air inlet holes 42b. In order to maintain strength adjacent to the air inlet holes 42b, in the present invention, round bars are crossed with each other to define an X-shaped figure and secured to each other by a turnbuckle 45. This assembly is simply referred to as an "X-shaped turnbuckle 45".

Since strength of the casing is maintained by the X-shaped turnbuckle 45 and the wedge-shaped partition wall 43, a steel frame is not needed other than the conventional art. According to this, a vibration absorbing characteristic of the casing is improved in comparison with the conventional cooling tower employing a steel frame, a problem caused by corrosion of the steel frame is solved, an assembling procedure is simplified, and a manufacturing cost is reduced.

In the cooling tower according to the present invention, in which strength is maintained by the wedge-shaped partition wall 43 and the X-shaped turnbuckle 45, the lower casing 42 is composed of four pieces, each for one side, which are connected one with another by bolts. An upper casing 46, in which a water distribution device, an eliminator and a fan cylinder are disposed, is composed of front and rear pieces and bolted to the lower casing 42.

Particularly, an upper end of the upper casing 46 is decreased in its diameter as in the case of a bottle neck, to form the fan cylinder, whereby a rigid structural body is realized.

As described above, the cooling tower according to the present invention does not require a steel frame. Instead, the cooling tower is constituted by the wedge-shaped partition wall 43, the X-shaped turnbuckle 45, the two-piece upper casing 46, the four-piece lower casing 42, the one-piece lower water tank 41, and a base platform. As a consequence, vibration from the fan is transferred to the base platform through the upper and lower casings, whereby vibration absorption rate is improved.

Industrial Applicability

As a result, the hybrid type cooling tower according to the present invention provides advantages in that cooling capability is significantly improved, and power loss and water dripping noise are considerably reduced.

Further, a diversity of devices which are located inside the cooling tower can be conveniently inspected and repaired.

Moreover, the hybrid type cooling tower can be easily installed at a reduced cost.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A hybrid type cooling tower including a water distributing device for distributing water of a high temperature, counterflow type fillers through which the water distributed from the water distributing device flows downward, a first eliminator for preventing drift of the water, louvers serving as passages for allowing inflow of outside air, a fan for forcibly circulating the outside air through the cooling tower and discharging air having undergone heat exchange with the water, to the outside, and a lower water tank for collecting the water which is cooled while flowing downward through the counterflow type fillers, characterized in that the hybrid type cooling tower further includes crossflow type fillers disposed inward of the louvers and below the counterflow type fillers, wherein the crossflow type filler has a plurality of mountain-shaped contours each of which comprises rightward inclined parts and leftward inclined parts which are alternately and integrally connected with each other in such a way as to define a zigzag pattern, with each leftward inclined part having a length different than each rightward inclined part, to form longer inclined parts and shorter inclined parts, at least one of the shorter inclined parts of each mountain-shaped contour being formed with pyramid-shaped portions.

2. The hybrid type cooling tower as claimed in claim 1, wherein a space part through which the outside air can flow into the cooling tower is defined below lower ends of the crossflow type fillers.

3. The hybrid type cooling tower as claimed in claim 2, wherein the space part has a height which is no greater than 30% of a height of the crossflow type filler.

4. The hybrid type cooling tower as claimed in claim 2, wherein a first water dripping noise attenuation plate is arranged at an upper end of the space part.

5. The hybrid type cooling tower as claimed in claim 2, wherein supporting pipes are installed through the crossflow type fillers, spacer projections are formed on the crossflow type fillers, and strength reinforcing parts are provided to upper and lower ends of the crossflow type fillers.

6. The hybrid type cooling tower as claimed in claim 2, wherein the crossflow type filler is made of a single sheet material which does not have any joint portion.

7. The hybrid type cooling tower as claimed in claim 1, wherein a wedge-shaped partition wall is disposed at a center portion of the crossflow type fillers.

8. The hybrid type cooling tower as claimed in claim 7, wherein venting holes through which the outside air can flow into the cooling tower are defined in the wedge-shaped partition wall.

9. The hybrid type cooling tower as claimed in claim 7, wherein a second eliminator for preventing drift of the water is interposed between the crossflow type fillers and the wedge-shaped partition wall.

10. The hybrid type cooling tower as claimed in claim 7, wherein a second water dripping noise attenuation plate is placed on the wedge-shaped partition wall.

11. The hybrid type cooling tower as claimed in claim 1, wherein the cooling tower is supported by the wedge-shaped partition wall disposed at the center portion of the crossflow type fillers and an X-shaped turnbuckle installed adjacent to air inlet holes through which air is sucked toward the crossflow type fillers.

12. The hybrid type cooling tower as claimed in claim 11, wherein the cooling tower includes the wedge-shaped partition wall, the X-shaped turnbuckle, a two-piece upper casing, a four-piece lower casing, the one-piece lower water tank, and a base platform.

13. The hybrid type cooling tower as claimed in claim 11, wherein reinforcing prominences and depressions are formed on the lower casing and door members which respectively close both ends of the wedge-shaped partition wall.

14. A hybrid type cooling tower including a water distributing device for distributing water of a high temperature, counterflow type fillers through which the water distributed from the water distributing device flows downward, louvers, serving as passages for allowing inflow of outside air, a fan for forcibly circulating the outside air through the cooling tower and discharging air having undergone heat exchange with the water, to the outside, and a lower water tank for collecting the water which is cooled while flowing downward through the counterflow type fillers, characterized in that the hybrid type cooling tower further includes crossflow type fillers disposed inward of the louvers and below the counterflow type fillers, wherein the crossflow type filler has a plurality of mountain-shaped contours each of which comprises inclined parts which are alternately and integrally connected with each other in such a way as to define a zigzag pattern, the filler having one inclined part to direct water outward toward the louver having a longer length than another inclined part directing water away from said louver inclined part, at least one of the said another shorter inclined parts of being formed with pyramid-shaped portions to provide for vertical water flow through a horizontal directed air flow from said louvers.

15. The hybrid type cooling tower as claimed in claims 1, wherein a space part through which the outside air can flow into the cooling tower is defined below lower ends of the crossflow type fillers.

16. The hybrid type cooling tower as claimed in claim 15, wherein the space part has a height which is no greater than 30% of a height of the crossflow type filler.

17. The hybrid type cooling tower as claimed in claim 15, wherein a first water dripping noise attenuation plate is arranged at an upper end of the space part.

18. The hybrid type cooling tower as claimed in claim 15, wherein supporting pipes are installed through the crossflow type fillers, spacer projections are formed on the crossflow type fillers, and strength reinforcing parts are provided to upper and lower ends of the crossflow type fillers.

19. The hybrid type cooling tower as claimed in claim 15, wherein the crossflow type filler is made of a single sheet material which does not have any joint portion.

* * * * *

UNITED STATES PATENT AND TRADEMARK OFFICE
CERTIFICATE OF CORRECTION

| | | |
|---|---|---|
| PATENT NO. | : 6,938,885 B2 | Page 1 of 1 |
| APPLICATION NO. | : 10/344485 | |
| DATED | : September 6, 2005 | |
| INVENTOR(S) | : Jae-Byeong Koo | |

It is certified that error appears in the above-identified patent and that said Letters Patent is hereby corrected as shown below:

Claim 15
Column 12, Line 12, After "as claimed in" delete "claims 1" insert --14--.

Signed and Sealed this

Eleventh Day of July, 2006

JON W. DUDAS
*Director of the United States Patent and Trademark Office*